(12) United States Patent
Reed et al.

(10) Patent No.: US 6,382,044 B1
(45) Date of Patent: May 7, 2002

(54) ACTUATOR HAVING A ROTATIONAL POWER SOURCE

(75) Inventors: Gordon K. Reed, Dublin; Albert A. Arehart, Lewis Center, both of OH (US)

(73) Assignee: ABB Automation Inc., Wickliffe, OH (US)

( * ) Notice: Subject to any disclaimer, the term of this patent is extended or adjusted under 35 U.S.C. 154(b) by 0 days.

(21) Appl. No.: 09/549,252

(22) Filed: Apr. 14, 2000

(51) Int. Cl.[7] .......................... F16H 1/06; F16H 37/12; F16H 53/00
(52) U.S. Cl. ................... 74/421 A; 74/400; 74/567; 74/606 R; 403/282; 403/329; 403/366
(58) Field of Search ................... 74/56, 396, 400, 74/421 R, 421 A, 567, 606 R; 403/282, 329, 366, 365

(56) References Cited

U.S. PATENT DOCUMENTS

| | | | | |
|---|---|---|---|---|
| 255,858 A | * | 4/1882 | Hidden | 403/329 X |
| 407,869 A | * | 7/1889 | Monk | 74/567 X |
| 3,127,786 A | * | 4/1964 | Wooley | 74/567 X |
| 4,619,233 A | * | 10/1986 | Yamaguchi | 123/357 |
| 4,774,818 A | * | 10/1988 | Ploppa et al. | 66/71 |
| 5,090,261 A | * | 2/1992 | Nakatsukasa | 74/400 |
| 5,249,881 A | * | 10/1993 | Austin, Jr. et al. | 403/378 |
| 5,377,555 A | * | 1/1995 | Hancock | 74/569 X |
| 5,887,353 A | * | 3/1999 | Beckingham | 33/292 |

* cited by examiner

Primary Examiner—Allan D. Herrmann
(74) Attorney, Agent, or Firm—Michael M. Rickin

(57) ABSTRACT

An actuator for a papermaking machine. The actuator is designed to function either as a slice lip or coatweight actuator or as a dilution actuator depending on the orientation of a cam disk in the actuator. The drive motor and position sensor in the actuator are in a side by side arrangement allowing for a single cover to enclose both the drive motor and the position sensor. The actuator has a manual adjustment which comes into engagement with the drive motor only when it is desired to manually adjust the actuator. The manual adjustment is designed so that it does not lock with the drive motor and requires only a moderate amount of force to be brought into engagement with the manual shaft. The actuator has a drive block connected to the speed reducer of the actuator. The drive block interfits with the cam disk in a manner to function as a spring loaded splined connection. This connection provides the necessary force to prevent rotary free play of the cam disk. The cam disk is free to rotate and move up and down in a motor plate. The position sensor is in contact with one side of the cam disk.

32 Claims, 10 Drawing Sheets

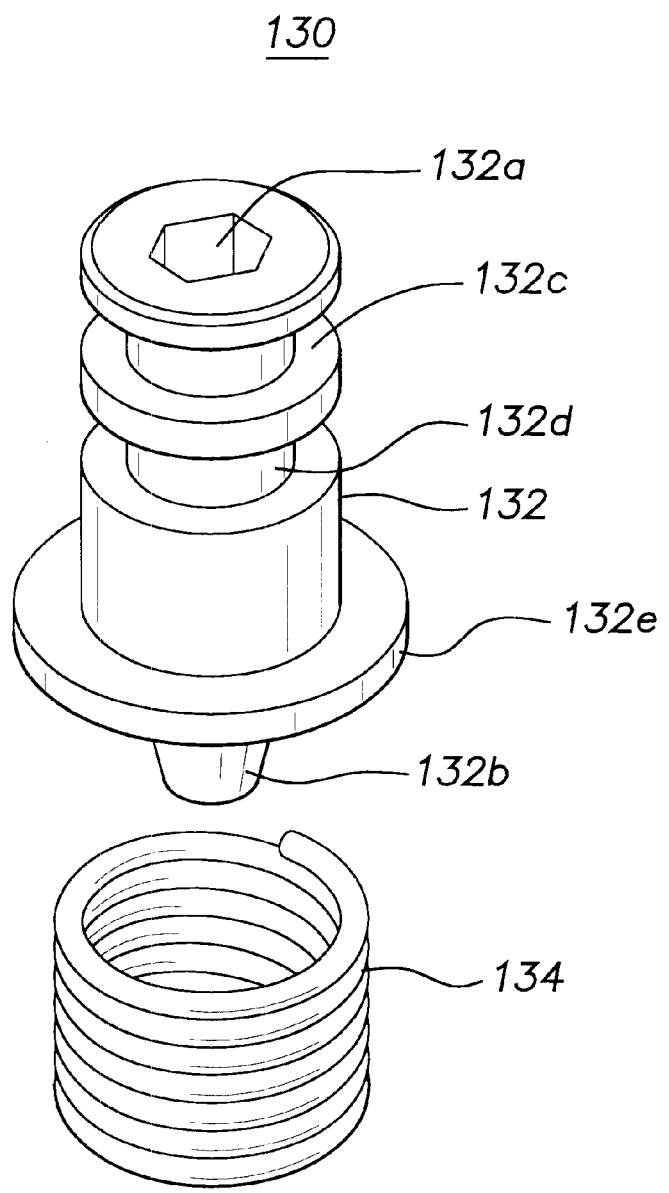

ACTUATOR HAVING A ROTATIONAL POWER SOURCE

1. FIELD OF THE INVENTION

This invention relates to actuators and more particularly to an actuator that can function in a paper making machine as either a slice lip actuator, a dilution actuator or a coatweight actuator.

2. DESCRIPTION OF THE PRIOR ART

A typical paper machine headbox distributes pulp slurry or stock through a long horizontal slit opening on to a perforated web or "wire".

In one type of paper machine the paper density or "basis weight" can be changed transverse the direction of the wire travel by opening or closing a long stainless us steel bar or "slice lip" which comprises the top of the slit opening. To this end there are attached to the slice lip a multiplicity of spindles or "slice rods" which are equally spaced across the slice lip.

Each spindle has associated therewith an actuator, referred to hereinafter as a slice lip actuator, that imparts a linear force to its associated spindle to thereby non-permanently deform the associated portion of the slice lip. This deformation gives rise to a slit opening which in combination with all of the other nonpermanent deformations of the slice lip imparted by associated slice lip actuators yields a paper sheet having a preselected weight that is uniform across the sheet. To be effective, a slice lip actuator must deliver a force ranging from typically ±500 pounds to as much as ±4,000 pounds. This force must be delivered in quick, precise, very small steps. At the same time, the actuator must be very small so that it can fit into and onto a multitude of headbox styles which have many and varying nearby encumbrances. Also, because downtime on a paper machine is very expensive, the slice lip actuator must be very easy to install and service.

Examples of various embodiments for prior art slice lip actuators are described in U.S. Pat. Nos. 4,892,623; 4,975,151; 5,060,539; and 5,172,600.

In another type of paper machine the basis weight profile of the web of paper is not controlled by changing the opening of the slice lip but rather by means of a series of dilution pipes or lines which extend across the width of the headbox. Water is controllably injected into the dilution lines to locally control the stock dilution thereby forming a variable consistency profile leaving the slice opening. By adjusting the amount of dilution at a plurality of points of the headbox across the machine, for example in response to a measured basis weight profile from on-line measurement, the basis weight profile of the web is controlled. This type of basis weight control is known as dilution control.

To precisely control the basis weight profile of a paper web being produced, it is apparent that the water flow in each of the dilution lines must be accurately and reliably controlled. In existing designs, this control has been performed by using conventional servo controlled ball valves, gate valves and needle valves with one valve per dilution line. Each valve has an associated actuator which will be referred to hereinafter as a dilution actuator. U.S. Pat. No. 5,549,793 describes the use of pinch valves in dilution lines of a dilution headbox of a paper making machine and shows such a valve driven by a linear motor.

In the manufacture of paper, it is often desirable to coat one or both sides of the paper web. The coating mixture is applied to the running paper web, which is typically supported on a rotating roll, and just downstream of the coating application zone, there is positioned a metering blade that controls the thickness of the coating to remain on the web. One example of a coating apparatus is disclosed in U.S. Pat. No. 4,903,632.

The purpose of the metering blade, which is often referred to as a doctor blade, is to control the thickness of the coating on the web. It is often desirable to modify the profile of the edge of the metering blade across the width of the web. A commonly utilized mechanism for doing this is a profile bar made of stainless steel and having an edge that engages a side face of the metering blade and extends the entire width of the web. Spindles having an associated actuator, referred to hereinafter as a coatweight actuator, engage the opposite edge of the profile bar at spaced apart directions along the axis of the bar and apply tensile or compressive forces to deform the bar so as to change the profile of the leading edge of the bar. This in turn deforms the metering blade so that the spacing of the metering blade edge from the surface of the web can vary across the width of the web.

A slice lip actuator or a coatweight actuator typically rotates thorough a multiplicity of turns in the actuation of its associated device. A typical dilution actuator, however, has to rotate only a ¼ turn, that is, 90°, in order to actuate its associated valve from one end position, e.g. fully closed, to its other end position, e.g. fully open. Therefore, the actuator presently used in dilution applications is different than the actuator presently used in slice lip or coatweight applications.

It is often necessary to manually adjust all actuators. In the present design of such actuators, the manual adjustment is made through a shaft that is connected to the actuator motor shaft. This connection means that since the actuator motor shaft turns millions of times during its product life the manual shaft will also turn the same number of times thereby leading to unacceptable wear of the manual shaft seal. In the design of actuators in accordance with the prior art the motor shaft typically extends outside of the enclosure and thus a seal must be provided to ensure environmental integrity of the motor. Seals can and do wear.

Further the height of an actuator is important as a slice lip actuator must occasionally fit in tight overhead clearance such as under the torque tube connecting gross slice jacks. The typical actuator consists of the in-line arrangement of a gearbox, a motor and a sensor. This arrangement maximizes the height of the actuator. In one such arrangement, the gearbox is between the motor and the sensor and the motor and sensor are each in individual sealed housings. This arrangement not only maximizes the height of the actuator but also requires two housings to environmentally protect the actuator, thereby making sealing of the actuator more complicated and expensive.

Additionally a slice lip actuator may have to provide a much higher torque than the torque that has to be provided by a dilution actuator. Further such high torque should be provided in a small package which allows for more actuators across the slice lip and therefore better control of the slice lip.

Additionally further the sensor of the actuator should have high resolution yet the actuator must still have a small package in width and not be as high as present actuators and should be easier to assemble than present actuators.

As is described above, the present state of the art is that an actuator used for both slice lip and coatweight applications cannot be used for dilution applications and vice versa.

It is, however, desirable that the same actuator be easily useable for all such applications and that the construction of the actuator be easily alterable so that an actuator used for slice lip or coatweight applications can be converted into one for dilution applications without the need for special tooling or new parts or recalibration of the position sensor that is part of the actuator.

SUMMARY OF THE INVENTION

An actuator comprising:
(a) a motor plate;
(b) a drive motor having a gear;
(c) a position sensor in side by side arrangement with the drive motor; and
(d) a speed reducer having a gear, an output shaft and a hollow input shaft for extending the output shaft; the motor plate having a first opening therein from a first side for receiving the speed reducer gear, a second opening therein from a second side opposite the first side for receiving the drive motor gear, the first and second opening each having a depth such that the drive motor gear engages the speed reducer gear; and a third opening therein for receiving the extended output shaft to thereby drive the position sensor.

An actuator comprising:
(a) a drive motor having a gear;
(b) a position sensor in side by side arrangement with the drive motor; and
(c) a speed reducer having a gear which is engaged with the drive motor gear, the speed reducer also having an output shaft and a hollow input shaft through which the output shaft is extended to thereby drive the position sensor.

An actuator comprising:
(a) a drive motor engaged with a speed reducer, the drive motor having a hollow shaft;
(b) an assembly for manually adjusting the actuator by engaging the hollow drive motor shaft, the assembly comprising:
    (i) a shaft having a first end and a stub at a second end for engagement with the drive motor hollow shaft when a force is applied to the first end; and
    (ii) a compression spring mounted on the stub for disengaging the shaft stub from the motor drive hollow shaft when the applied force is removed from the first end.

An actuator comprising:
(a) a drive motor having a gear;
(b) a position sensor in side by side arrangement with the drive motor;
(c) a cam disk having a first side having a predetermined shape and a second opposed side, the first side facing the position sensor, the position sensor in contact with the cam disk first side; and
(d) a speed reducer having a gear which is engaged with the drive motor gear, the speed reducer also having an output shaft and a hollow input shaft through which the output shaft is extended, the extended output shaft connected to the cam disk to thereby cause motion of the cam disk when the actuator is energized.

A cam disk for an actuator comprising:
(a) a first side that is flat; and
(b) a second side opposed to the first side, the second side having a tapered ramp thereon.

An actuator comprising:
(a) a drive motor having a gear;
(b) a position sensor in side by side arrangement with the drive motor;
(c) a cam disk having an opening therethrough and a first side having a predetermined shape and a second opposed side, the first side facing the position sensor, the position sensor in contact with the cam disk first side;
(d) a drive block having an opening, the drive block residing in the cam disk opening; and
(e) a speed reducer having a gear which is engaged with the drive motor gear, the speed reducer also having an output shaft and a hollow input shaft through which the output shaft is extended, the extended output shaft connected to the drive block opening to thereby cause motion of the cam disk when the actuator is energized.

A drive block for an actuator comprising:
(a) a first cantilever leaf spring;
(b) a second cantilever leaf spring; and
(c) an opening partway therethrough.

DESCRIPTION OF THE DRAWING

FIG. 6 shows a detailed view of the manual shaft of the actuator of FIG. 1.

DESCRIPTION OF THE PREFERRED EMBODIMENTS

Figure 1:
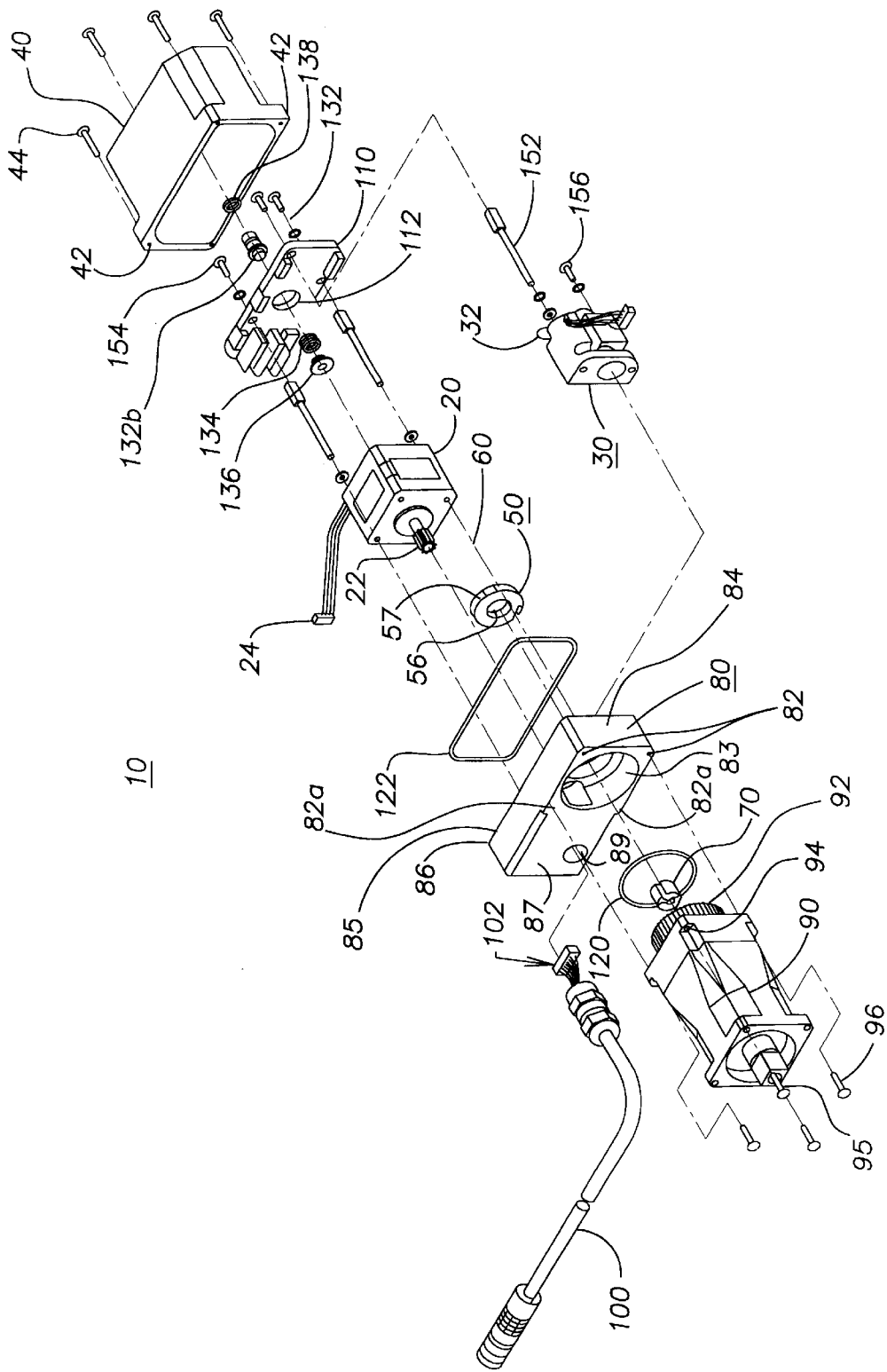
FIG. 1 shows an exploded perspective of the actuator of the present invention.

Referring now to FIG. 1, there is shown an exploded perspective of the actuator of the present invention. Actuator includes a stepper drive motor 20 and a position sensor 30, embodied herein in the form of an LVDT (linear variable differential transformer), which are mounted in a side by side arrangement when actuator is assembled. It is this side by side mounting which reduces the height of actuator as compared to the height of actuators embodied in accordance with the prior art. This side by side arrangement allows actuator to be environmentally sealed by a single enclosure 40 as compared to the two enclosures needed to environmentally seal actuators embodied in accordance with the prior art.

Actuator 10 also includes printed circuit board 110.

While not shown in FIG. 1, circuit board 110 includes the driver circuit for stepper motor 20, the signal conditioning circuitry for sensor 30, and diagnostic circuitry.

Figure 2B:
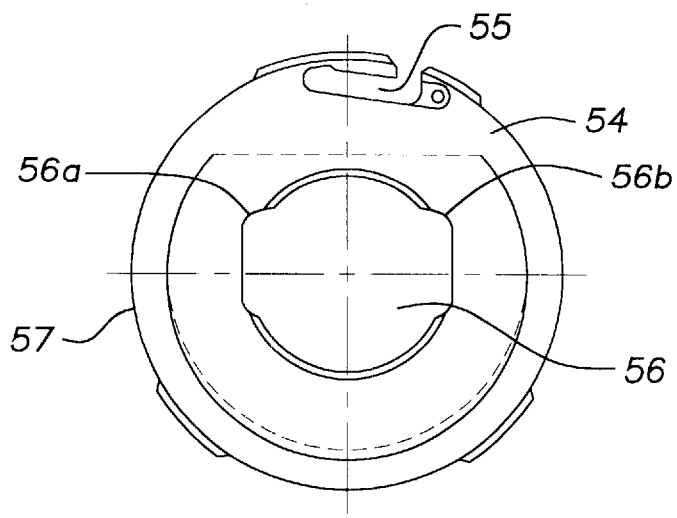
FIGS. 2a and 2b show a detailed view of the cam disk of the actuator of FIG. 1.
Figure 2A:
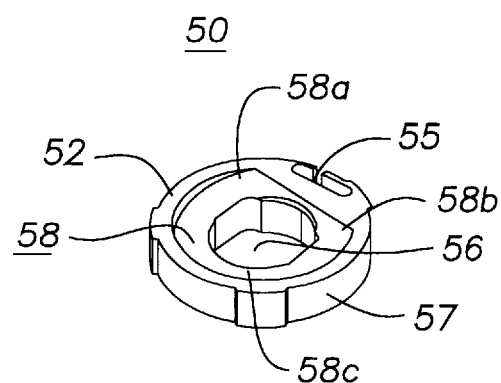
Figure 3:
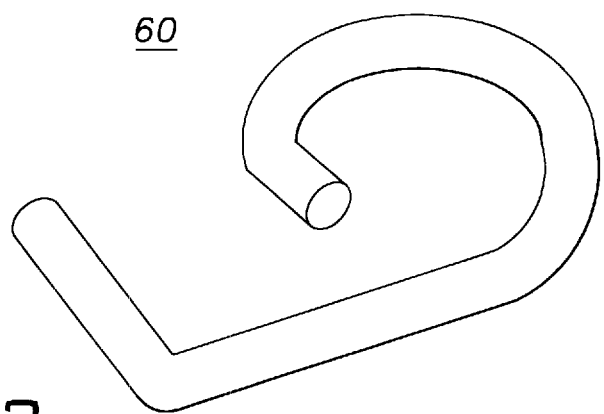
FIG. 3 shows a detailed view of the cam disk spring of the actuator of FIG. 1.
Figure 2C:
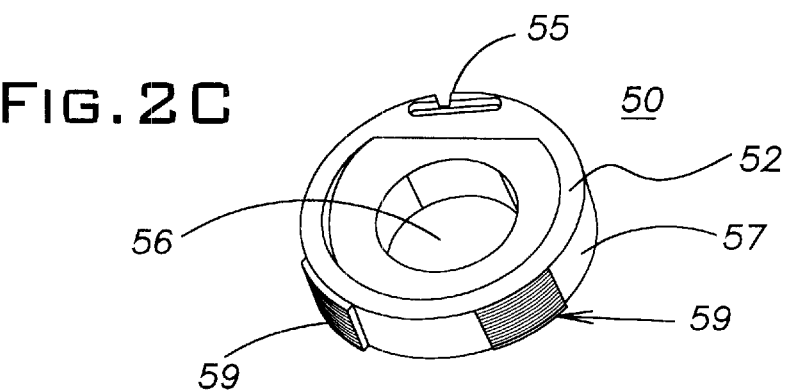
FIG. 2c shows the cam disk with threads on the edge thereof.

Actuator 10 further includes a cam disk 50, a cam disk spring 60, and a drive block 70 more detailed views of which are shown in FIGS. 2a and b, 3 and 4a, b, and c, respectively. Cam disk 50 has on its outer edge 57 threads 59 which are shown in FIG. 2c. As will be described in more detail hereinafter these threads allow cam disk 50 to rotate and move up and down when actuator is assembled.

Further as will be described in more detail hereinafter in connection with FIGS. 2a and b, cam disk 50 has a first side 52 (FIG. 2a) that has a U shaped ramp which allows the actuator to rotate in either direction through the ¼ turn necessary for actuator to function as a dilution actuator and a second side 54 (FIG. 2b) that is flat and allows actuator to rotate in either direction through the predetermined number of complete multiple turns necessary for actuator to function as either a slice lip actuator or a coatweight actuator. Cam disk 50 is shown in FIG. 1 with side 52 facing towards position sensor 30.

When actuator functions as either a slice lip actuator or a coatweight actuator and the cam disk rotates in either direction through the predetermined number of complete multiple turns the position sensor probe will move a certain distance. When actuator 10 functions as a dilution actuator and the cam disk rotates in either direction through a complete ¼ turn the position sensor probe will move a certain distance. Actuator 10 is designed such that the certain distance that the probe moves when the slice lip or coatweight actuator is rotated in either direction through the predetermined number of complete multiple turns is equal to the certain distance that the probe moves when the dilution actuator moves in either direction through a complete ¼ turn.

When actuator 10 is assembled, cam disk spring 60 is inserted into a pocket 55 (see FIGS. 2a and 2b) created in cam disk 50 to thereby provide the force necessary to prevent linear free play of cam disk 50. Sensor 30 also includes a spring 32 that provides, when actuator 10 is assembled, a downward force to prevent free play of the sensor.

Actuator 10 further also includes a motor plate 80 and a speed reducer embodied herein as a planetary gearhead 90. While not shown in FIG. 1 but is well known, position sensor 30 includes a probe that extends outwardly towards motor plate 80. The probe rests either on the U shaped ramp of side 52 of the cam disk if that side faces the position sensor 30 when actuator 10 is assembled or on the flat side 54 if that side faces the position sensor 30 when actuator 10 is assembled.

Figure 5A:
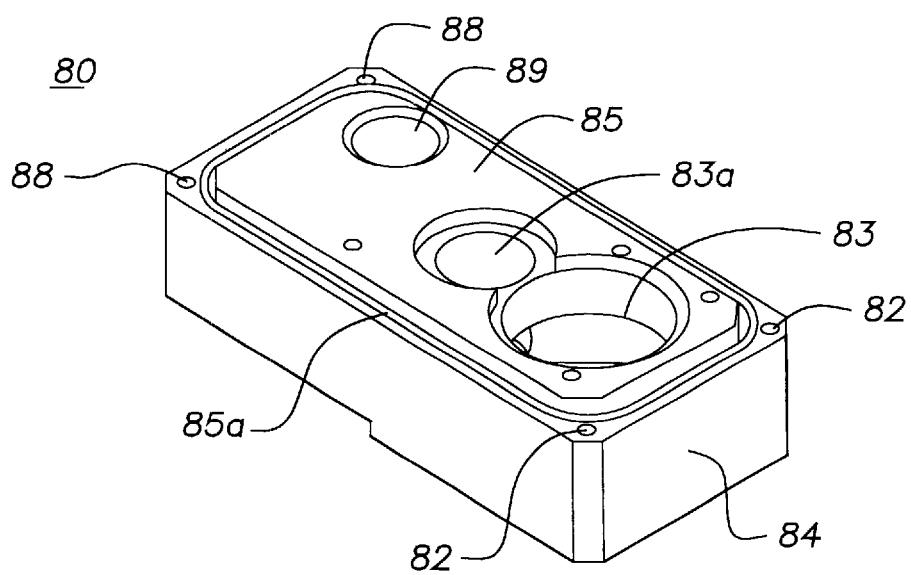
FIGS. 5a and 5b show a detailed view of the motor plate of the actuator of FIG. 1.

As can be seen in FIG. 1, motor plate 80 includes two through holes 82 located adjacent a peripheral edge 84 thereof and two other holes 88, not shown in FIG. 1 but in FIG. 5a, located adjacent peripheral edge 86, which is parallel to edge 84. These two other holes 88 extend partway through plate 80 from the side 85 of plate 80 that faces the bottom of cover 40.

Figure 5B:
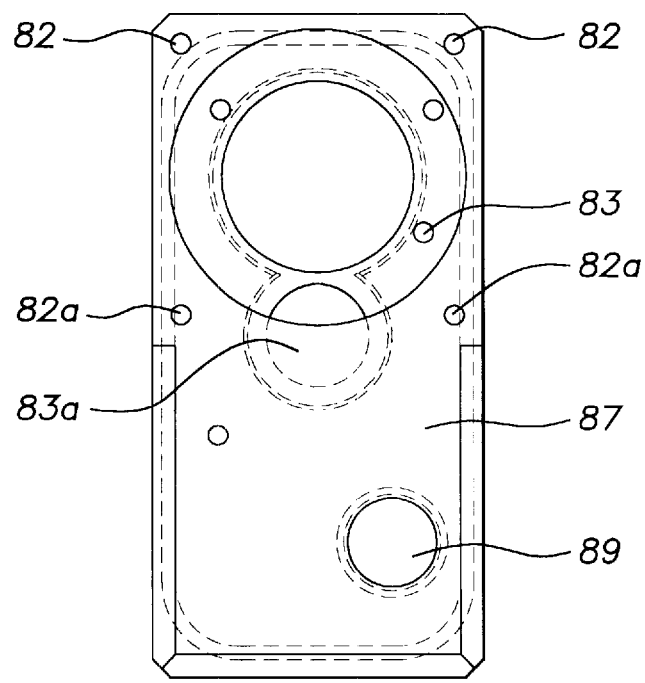

As can be seen in FIG. 1, cover 40 has four peripheral holes 42 which are in alignment with holes 82 and 88 when actuator 10 is assembled. The holes 42, 82 and 88 allow the cover 40 to be secured to plate 80 by suitable hardware such as screws 44 (threads not shown in FIG. 1) when actuator 10 is assembled. It should be noted that screws 44 extend only partway through holes 82 when actuator 10 is assembled. An O-ring gasket 122 is seated in a trough 85a (see FIG. 5) of face 85 of plate 80 when actuator is assembled.

Gearhead 90 includes a gear 92 and four holes 94, only one of which is clearly shown in FIG. 1, around the peripheral edge of gearhead 90 that faces towards side 87 of motor plate 80. As is shown in FIGS. 1 and 5a, plate 80 has a large circular opening 83 which extends partway therethrough from the side 87 of plate 80 that faces the gearhead 90 towards the side 85 of the plate 80 that faces the cover 40. Opening 83 is sized to receive gear 92 and O-ring 120 when actuator is assembled. The periphery of opening 83 has threads which are so fine that they cannot be shown in either FIG. 1 or in FIG. 5a. These threads are complementary to the fine threads on the outer edge 57 of cam disk 50. There are two holes 82a adjacent opening 83. The holes 82a are opposite the holes 82.

All four holes 94 are in alignment with holes 82 and 82a in plate 80. The alignment of holes 94 with the associated four holes 82 and 82a allows the gearhead 90 to be secured to plate 80 by suitable hardware such as screws 96 (threads not shown in FIG. 1) when actuator is assembled.

As is shown in FIG. 5a, plate 80 also has another circular opening 83a which extends partway therethrough from the side 85 of plate 80 that faces the cover 40 towards the side 87 of plate 80 that faces the gearhead 90. Opening 83a is sized to receive the gear 22 of motor 20.

Plate 80 also has a circular opening 89 which extends all the way through plate 80 to receive the electrical connector 24 of motor 20 so that the motor 20 can be electrically connected to connector 102 at the end of power cable 100.

Actuator 10 also additionally further includes a manual actuator adjustment assembly 130 (see FIG. 6) which passes through an opening 112 in circuit board 1when actuator 10 is assembled. Assembly 130 includes a manual shaft 132 a top and front view of which is shown in FIG. 6. As is shown in FIG. 6, shaft 132 includes a hex shaped opening 132a wherein a technician can insert a screwdriver with a complementary hex shaped head to thereby manually adjust the actuator.

Manual adjustment requires that the technician push down on the manual shaft 132 so that the end or stub 132b engages the hollow shaft (not shown) of motor 20. As is shown in FIG. 6, the end 132b of manual shaft 132 that engages the hollow shaft of motor 20 is tapered to prevent the technician from applying too high a torque with the screwdriver as such a torque might damage the gears of the motor. In one embodiment for the manual shaft, the total included angle of the taper of stub 132b, that is the total angle on both sides of the center line, was selected to be 20°. Such an angle allows the tapered stub 132b to act as a clutch, allows the technician to push down on the manual shaft 132 without having to exert too much and prevents the tapered stub 132b from locking with the hollow shaft of stepper motor 20. As is well known to those of ordinary skill in the art, if the total included angle of the taper of stub 132*b* is too small then the stub will lock with the hollow shaft of stepper motor 20 and if that angle is too wide then the operator has to push down on the manual shaft 132 with too much force.

Assembly 130 also includes a compression spring 134, ferrule 136 and O-rings 138 (see FIG. 1). Spring 134, which resides on tapered stub 132*b* of manual shaft 132 when actuator is assembled, disengages the manual shaft 132 from the hollow shaft of stepper motor 20 when the force applied by the technician is removed. Manual shaft 132 includes first and second O-ring glands 132*c* and 132*d* and base 132*e* for spring 134.

Actuator also further includes as is shown in FIG. 1 various additional screws 152, 154 and 156 which are used in the assembly of actuator 10. The threads are not shown on any of the screws. Screws 152 have tapped holes in their heads to receive screws 154 and associated washers 155 when actuator 10 is assembled.

Referring now to FIG. 2*a* there is shown a detailed view of side 52 of cam disk 50. As is shown therein, cam disk 50 has an opening 56 for receiving drive block 70 when actuator is assembled. As is also shown in FIG. 2*a*, side 52 has a tapered U shaped ramp 58 which at ends 58*a* and 58*b* is level with the surface of side 52. Ramp 58 is tapered downwardly from ends 58*a* and 58*b* such that its maximum depth below the surface of side 52 is at the mid point 58*c* of the ramp. When actuator is assembled with ramp 58 facing position sensor 30, the actuator can only rotates the ¼ turn needed to actuate a valve from its fully closed position to its fully open position. Thus, when actuator 10 is assembled with side 52 facing position sensor 30, actuator can be used as a dilution actuator.

As is shown in FIG. 2*b*, cam disk 50 has a side 54 which is opposite side 52. Side 54 is flat. When actuator 10 is assembled with side 54 facing position sensor 30, the actuator can rotate through the predetermined number of multiple complete turns. The flat side 54 of cam disk 50 then raises or lowers the position sensor probe depending on the direction of rotation of the actuator. Thus, when actuator 10 is assembled with side 54 facing position sensor 30, actuator 10 can be used as a slice lip actuator or a coatweight actuator.

As was described above, actuator 10 can function either as a dilution actuator when side 52 of cam disk 50 faces position sensor 30 or as a slice lip or coatweight actuator when side 54 of cam disk 50 faces position sensor 30. Further, actuator 10 is designed such that the ¼ turn of the dilution actuator and the full complete multiple turns of the slice lip or coatweight actuator both cause the position sensor 30 to move the same precalibrated distance. In addition, actuator 10 is designed so that after assembly the actuator 10 can be opened, the side of the cam disk facing the position sensor can be changed and the actuator reassembled without the need for any special tooling or new parts or recalibration of the position sensor 30. Thus, for example, a technician could in the field alter the construction of a slice lip or coatweight actuator designed in accordance with the present invention to that of a dilution actuator or vice versa. This alteration in construction may be necessary where the technician has to replace an actuator 10 of one type and the only spare actuator 10 available is of the other type.

Figure 4A:
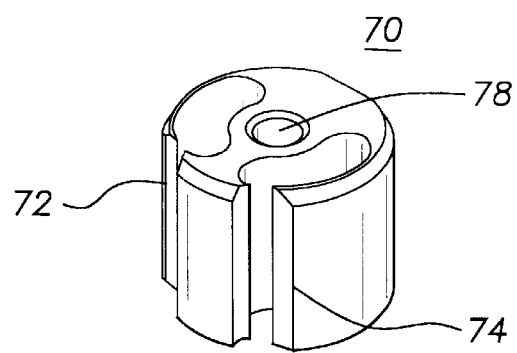
FIGS. 4a, 4b and 4c show a detailed view of the drive block of the actuator of FIG. 1.

Referring now to FIGS. 4*a, b,* and *c*, there is shown a detailed view of the drive block 70. Block 70 is cylindrical in shape and is cut to form two cantilever leaf springs 72, 74 which are sprung open. As is shown in FIG. 2*b*, cam disk 50 has an essentially circular opening 56 the diameter of which matches the diameter of drive block 70 when leaf springs 72, 74 are not sprung. As is also shown in FIG. 2, circular opening 56 of cam disk 50 has two angled flats 56*a*, 56*b*. Springs 72, 74 engage an associated one of flats 56*a*, 56*b* when cam disk 50 is inserted in opening 56 to thereby keep the drive block 70 from rotating. While not shown in FIG. 1, gearhead 90 has an input shaft that faces towards side 76 and the shaft fits into opening 78 when actuator is assembled. Block 70 also has a tapped hole 77 in side 79. Tapped hole 77 receives a set screw, not shown in FIGS. 4*a, b,* and *c*, which is used to lock the drive block 70 to the shaft of gearhead 90 when actuator is assembled.

In gearhead 90 multiple turns of the input shaft (the shaft not shown in FIG. 1 on which gear 92 is mounted) results in one turn of output shaft 95. Due to the existence of several combinations of gear trains in gearhead 90 some backlash exists between the input shaft and output shaft 95. Although the backlash is very small, it is necessary to avoid the backlash in the measurement of the rotation of the output shaft 95. To avoid this backlash, the prior art actuators typically locate the sensor at the gearhead output shaft which does not allow for a common enclosure for the position sensor, drive motor and circuit board 110.

In accordance with the present invention, the input shaft of gearhead 90 is hollow, known as a quill, which allows for the output shaft 95 to be extended upwards through the hollow input shaft to thereby drive the position sensor 30 without backlash. Thus in the actuator 10 of the present invention a single enclosure can be used for the drive motor 20, position sensor 30 and circuit board 110.

Since the output shaft 95 of gearhead 90 is extended through the hollow input, the extended output shaft 95 is secured to the drive block 70 by inserting the shaft into opening 78 and tightening set screw 77 when actuator is assembled. When actuator 10 is assembled, the drive block 70 is inserted in opening 56 of cam disk 50. The inserted drive block functions as a spring loaded splined connection which provides the force necessary to prevent rotary free play of the cam disk 50. The splined connection also allows the cam disk 50 to rotate. The cam disk 50 is brought into engagement with opening 83 of the motor plate 80 and the threads on the outer edge 57 mate with the complementary threads on the periphery of opening 83.

When actuator 10 is assembled and energized, stepper motor 20 drives planetary gearhead 90 to thereby rotate the extended output shaft 95. The rotation of the shaft 95 causes drive block 70 to rotate. Since the cam disk is slidably connected to the drive block 70, the cam disk 50 will rotate and either move up or down in the motor plate opening 83 depending on the direction of rotation of the actuator 10.

As can be appreciated by those of ordinary skill in the art, the elements of actuator 10 such as cam disk 50, may be fabricated from materials that have, among other characteristics, a low coefficient of friction.

Figure 7:
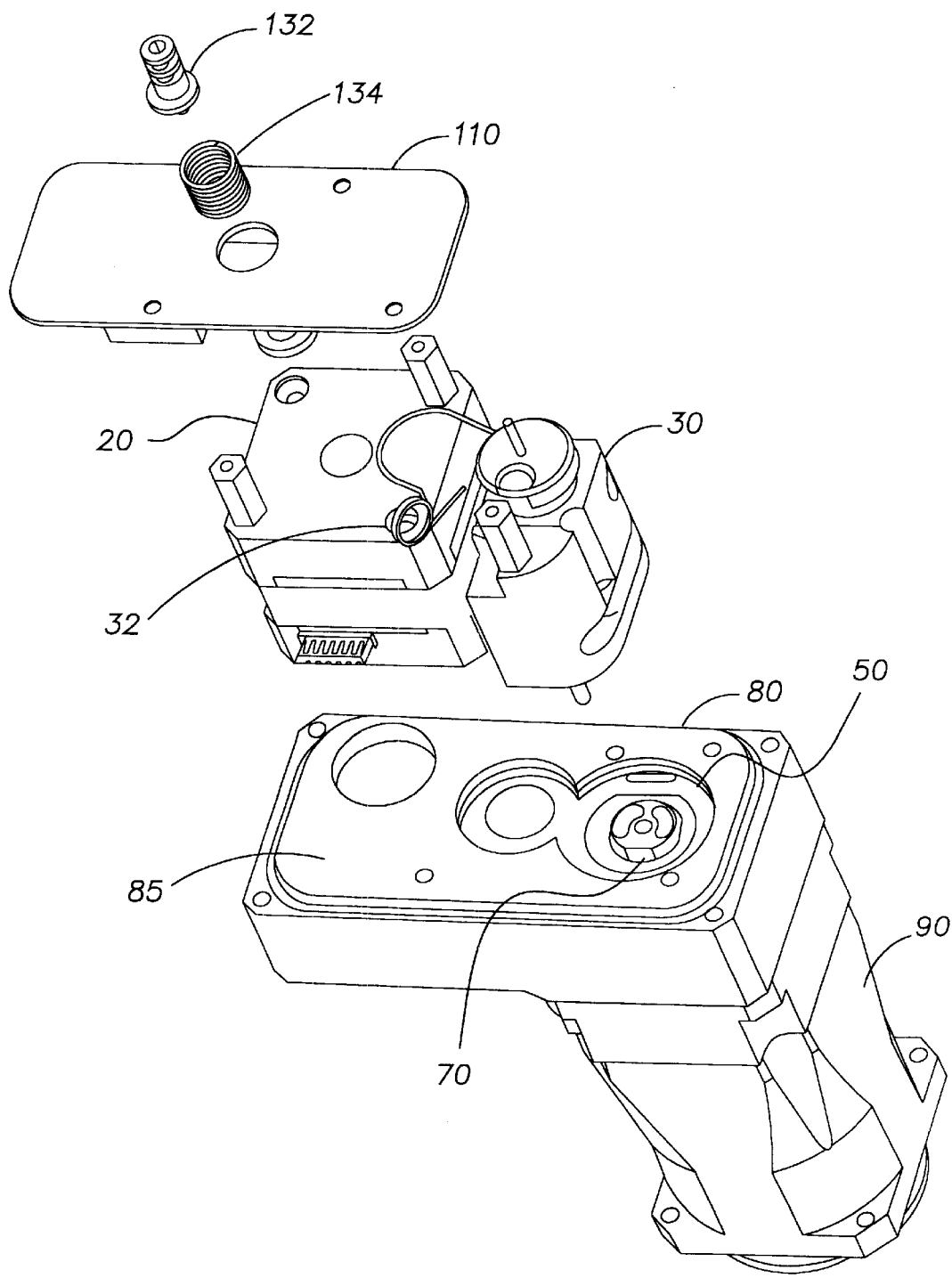
FIG. 7 shows a perspective of the actuator of the present invention with the motor plate and gearhead assembled to each other and includes the position sensor and stepper motor in a side by side arrangement, the drive block residing on the cam disk opening with the leaf springs of the drive block inserted in that opening.

Referring now to FIG. 7 there is shown a perspective of the actuator 10 with the motor plate 80 and gearhead 90 assembled to each other. FIG. 7 also shows the position sensor 30 and stepper motor 20 in a side by side arrangement. FIG. 7 also shows the drive block 70 residing in the 56 of the cam disk 50 with the leaf springs 72, 74 of drive block 70 inserted in the opening 56.

Figure 8:
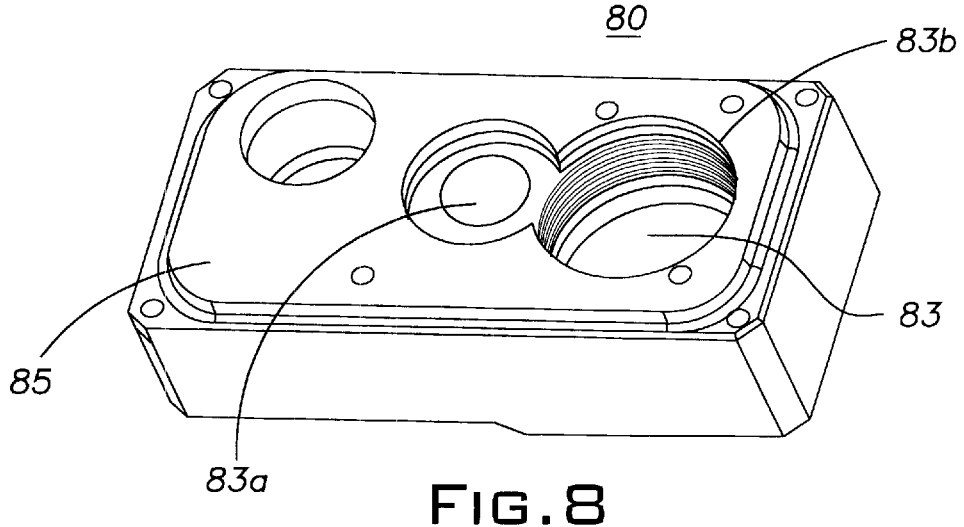
FIG. 8 shows the motor plate including the fine threads in the opening in that block.
Figure 4B:
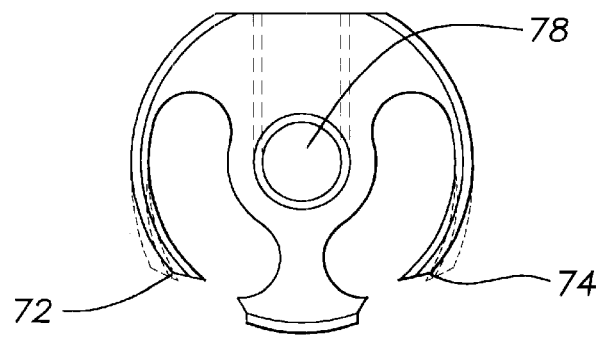
Figure 4C:
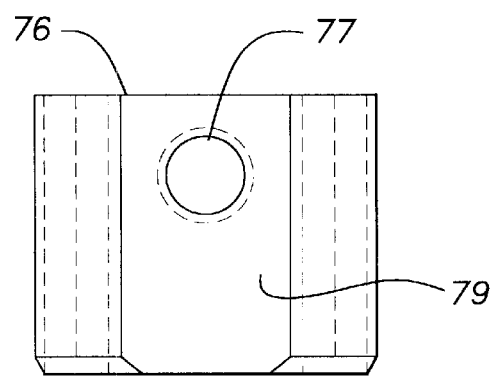

Referring now to FIG. 8 there is shown another view of motor plate 80 including the fine threads 83*b* in the opening 83 in block 80. FIG. 8 also shows the circular opening 83*a* which is also shown in FIG. 4. As was described above in connection with FIG. 4 the opening 83a receives as is shown in FIG. 10 the gear 22 of motor 20 when actuator 10 is assembled.

Figure 9:
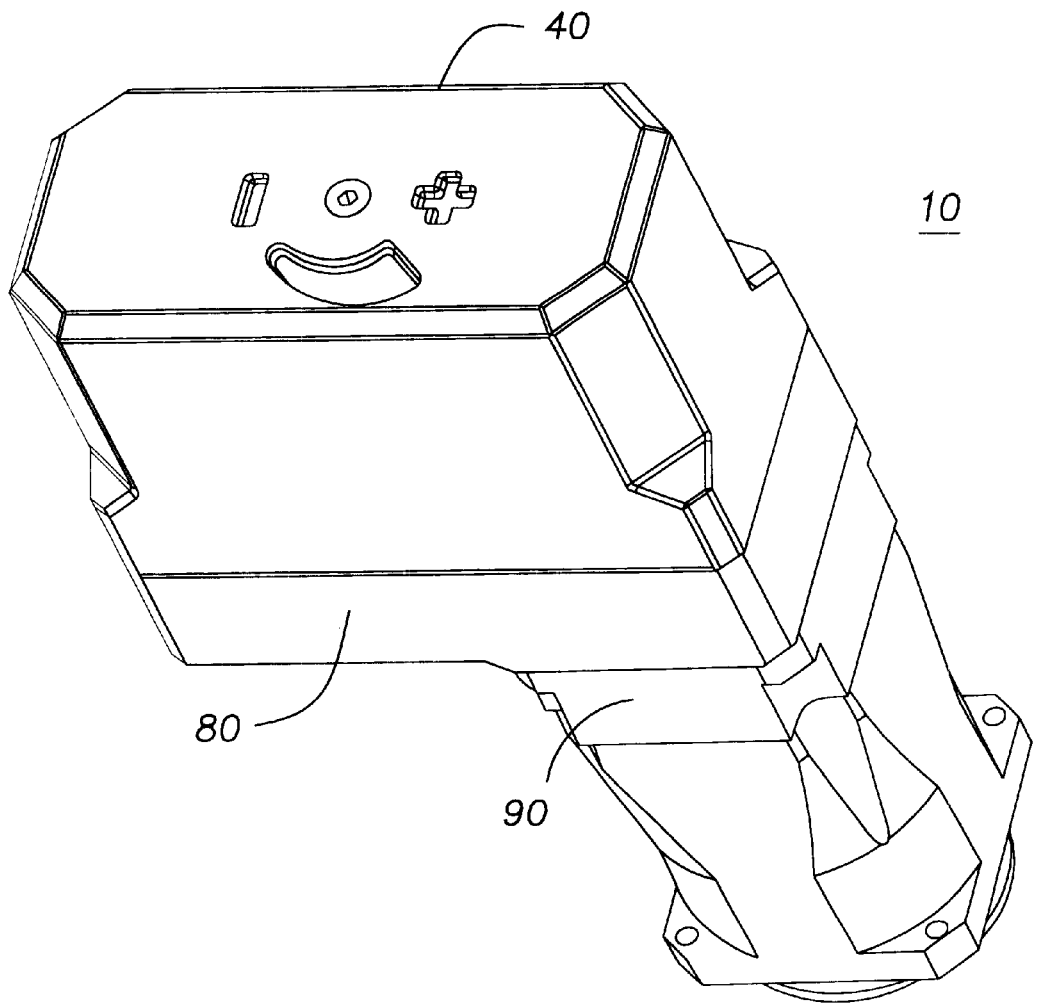
FIG. 9 shows the assembled actuator of the present invention.

Referring now to FIG. 9 there is the assembled actuator 10 of the present invention. FIG. 10 shows in section the assembled actuator 10. FIG. 10 also shows the flat side 54 of the cam disk 50 facing the position sensor 30. FIG. 10 also shows the hollow input shaft 98 of the gearhead 90. FIG. 10 further shows the drive motor gear 22 engaging the speed reducer gear 92 of the gearhead 90 with both gears mounted in the motor plate 80.

Figure 10:
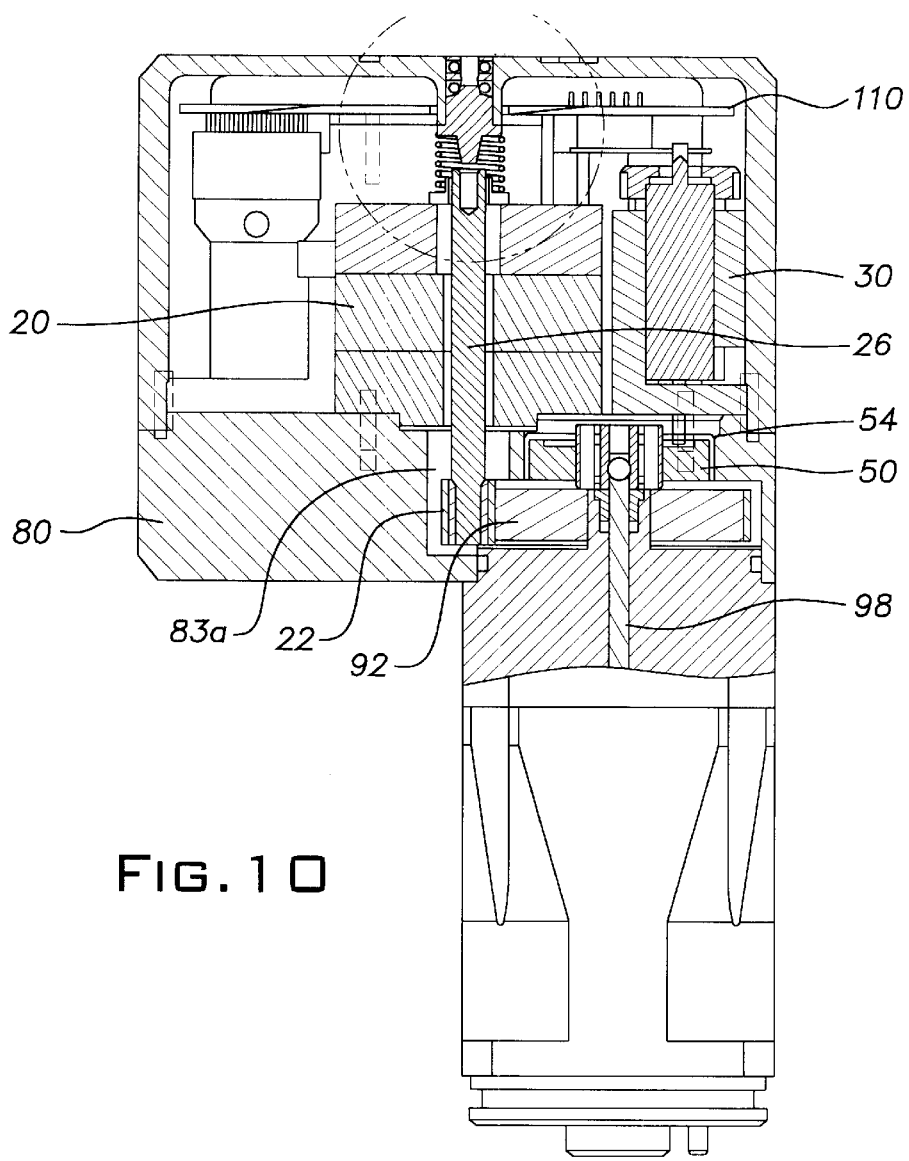
FIG. 10 shows in section the assembled actuator of the present invention and includes the flat side of the cam disk facing the position sensor, the hollow input shaft of the gearhead and the drive motor gear engaging the speed reducer gear of the gearhead with both gears mounted in the motor plate.
Figure 11:
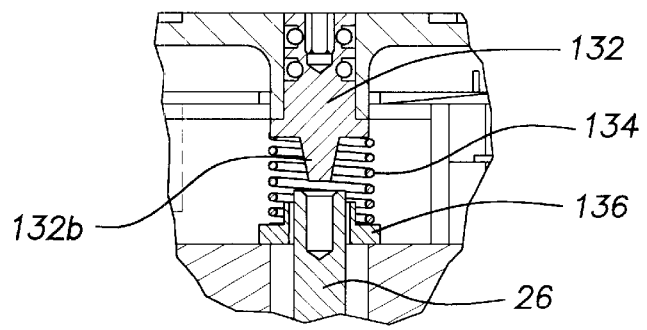
FIG. 11 shows an enlargement of that part of FIG. 10 which includes the stub of the manual shaft engaging the drive motor hollow shaft.

Referring now to FIG. 11 there is shown an enlargement of that part of FIG. 10 which includes the stub 132b of the manual shaft 132 of FIG. 6 engaging the hollow shaft 26 (also shown in FIG. 10) of drive motor 20. FIG. 11 also shows the spring 134 and ferrule 136 which are also shown in FIG. 6.

Figure 12:
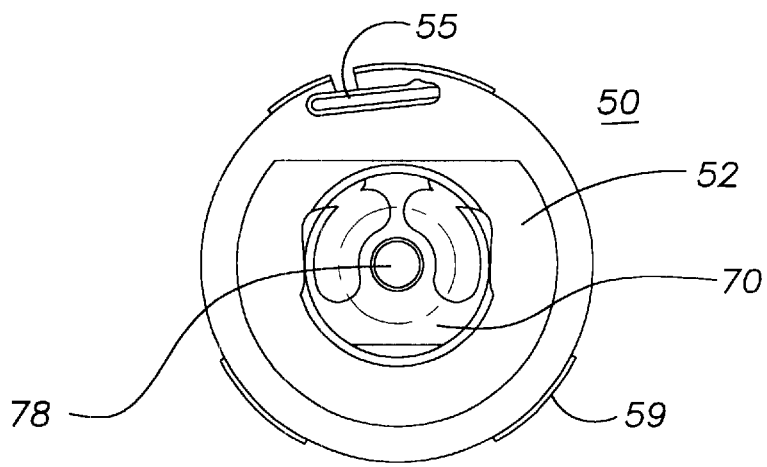
FIG. 12 shows the cam disk and drive block in assembled relationship with the leaf springs of the drive block in the opening of the cam disk.

Referring now to FIG. 12 there is shown the cam disk 50 and drive block 70 in assembled relationship with the leaf springs 72, 74 of the drive block 70 in the opening 56 of the cam disk 50. FIG. 12 also shows the threads 59 on the outer edge 57 of cam disk 50.

Figure 13:
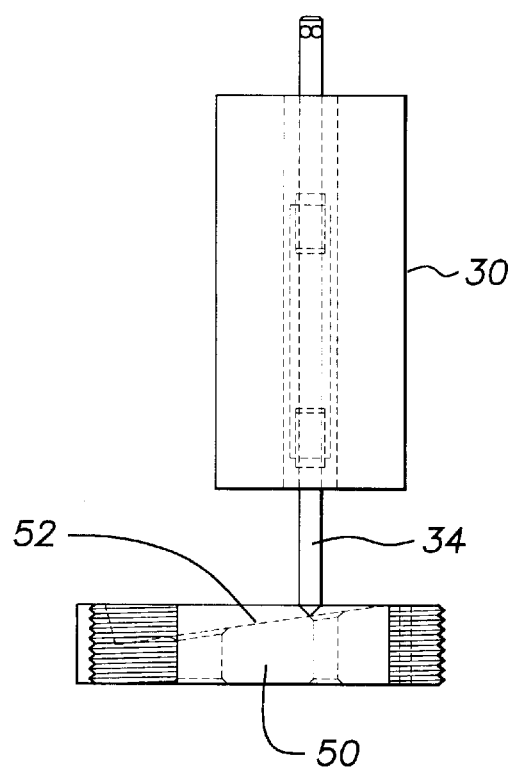
FIG. 13 shows the position sensor and the cam disk.

Referring now to FIG. 13 there is shown the position sensor 30 and cam disk 50 in the relationship they have when actuator 10 is assembled and side 52 of cam disk 50 faces position sensor 30. The probe 34 of position sensor 30 engages the U-shaped ramp 58 on side 52 of cam disk 50.

Figure 14:
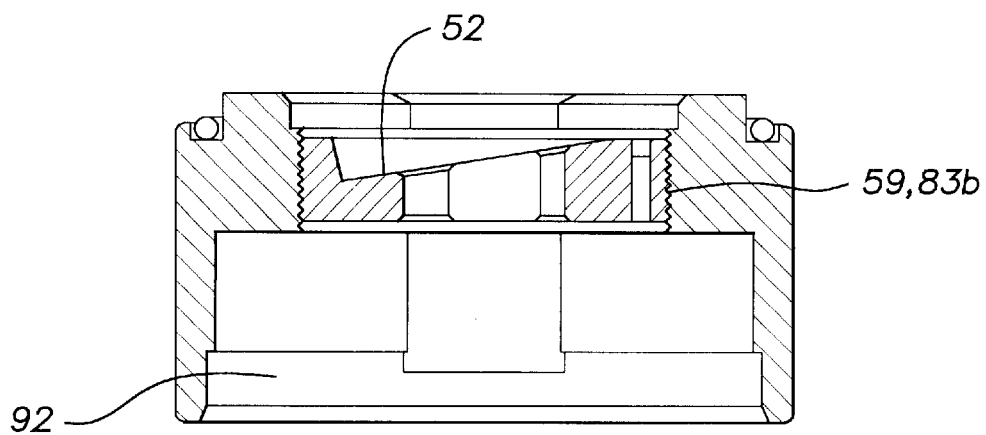
FIG. 14 shows in section the cam disk, the drive block and a portion of the motor plate including the threads therein engaging the complementary threads on the exterior surface of the cam disk.

Referring now to FIG. 14 there is shown in section the cam disk 50, the drive block 70 and a portion of the motor plate 80. FIG. 14 shows the motor plate threads 83b engaging the complementary threads 59 on the outer edge 57 of the cam disk 50.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An actuator comprising:
   (a) a motor plate;
   (b) a drive motor having a gear;
   (c) a position sensor in side by side arrangement with said drive motor; and
   (d) a speed reducer having a gear, an output shaft and a hollow input shaft for extending said output shaft;
   said motor plate having a first opening therein from a first side for receiving said speed reducer gear, a second opening therein from a second side opposite said first side and through said motor plate to said first side for receiving said drive motor gear, said first and second opening each having a depth such that said drive motor gear engages said speed reducer gear; said second opening for receiving said extended output shaft from said first side to thereby drive said position sensor.

2. An actuator comprising:
   (a) a drive motor having a gear;
   (b) a position sensor in side by side arrangement with said drive motor; and
   (c) a speed reducer having a gear which is engaged with said drive motor gear, said speed reducer also having an output shaft and a hollow input shaft through which said output shaft is extended to thereby drive said position sensor.

3. The actuator of claim 2 further comprising a single enclosure for enclosing both said drive motor and said position sensor.

4. The actuator of claim 2 further comprising a motor plate having a first opening therein from a first side for receiving said speed reducer gear and a second opening therein from a second side opposite said first side for receiving said drive motor gear, said first and second openings each having a depth such that said drive motor gear is engaged with said speed reducer gear.

5. The actuator of claim 4 wherein said motor plate further has a third opening through which said extended output shaft passes.

6. The actuator of claim 2 further comprising a motor plate adapted to allow said speed reducer gear to engage said drive motor gear.

7. The actuator of claim 6 wherein said motor plate is further adapted to allow said extended output shaft to pass therethrough.

8. The actuator of claim 4 further comprising a single enclosure for enclosing both said drive motor and said position sensor.

9. The actuator of claim 8 wherein said single enclosure is mounted to said motor plate.

10. The actuator of claim 6 further comprising a single enclosure for enclosing both said drive motor and said position sensor.

11. The actuator of claim 10 wherein said single enclosure is mounted to said motor plate.

12. An actuator comprising:
   (a) a drive motor engaged with a speed reducer, said drive motor having a hollow shaft;
   (b) an assembly for manually adjusting said actuator by engaging said hollow drive motor shaft, said assembly comprising:
      (i) a shaft having a first end and a stub at a second end for engagement with said drive motor hollow shaft when a force is applied to said first end; and
      (ii) a compression spring mounted on said stub for disengaging said shaft stub from said motor drive hollow shaft when said applied force is removed from said first end.

13. The assembly for manually adjusting said actuator of claim 12 wherein said shaft second end stub is tapered.

14. The assembly for manually adjusting said actuator of claim 12 wherein said assembly shaft first end has an opening therein for receiving said applied force.

15. The assembly for manually adjusting said actuator of claim 14 wherein said first end opening is of a predetermined shape and said applied force is applied by a tool having a shape complementary to said predetermined shape.

16. The assembly for manually adjusting said actuator of claim 13 wherein the total included angle of said taper of said second end stub is greater than that included angle which causes said stub to lock with said hollow motor drive shaft when a force is applied to said first end of said manually adjusting shaft.

17. An actuator comprising:
   (a) a drive motor having a gear;
   (b) a position sensor in side by side arrangement with said drive motor;
   (c) a cam disk having a first side which is flat and a second opposed side having a tapered ramp thereon, said second opposed side facing said position sensor, said position sensor in contact with said cam disk second side; and (d) a speed reducer having a gear which is engaged with said drive motor gear, said speed reducer also having an output shaft and a hollow input shaft through which said output shaft is extended, said extended output shaft connected to said cam disk to thereby cause motion of said cam disk when said actuator is energized.

18. An actuator comprising:

(a) a drive motor having a gear;

(b) a position sensor in side by side arrangement with said drive motor;

(c) a cam disk having a first side which is flat and a second opposed side having a tapered ramp thereon, said first side facing said position sensor, said position sensor in contact with said cam disk first side; and (d) a speed reducer having a gear which is engaged with said drive motor gear, said speed reducer also having an output shaft and a hollow input shaft through which said output shaft is extended, said extended output shaft connected to said cam disk to thereby cause motion of said cam disk when said actuator is energized.

19. An actuator comprising:

(a) a drive motor having a gear;

(b) a position sensor in side by side arrangement with said drive motor;

(c) a cam disk having a first side having a predetermined shape and a second opposed side, said first side facing said position sensor, said position sensor in contact with said cam disk first side; and (d) a speed reducer having a gear which is engaged with said drive motor gear, said speed reducer also having an output shaft and a hollow input shaft through which said output shaft is extended, said extended output shaft connected to said cam disk to thereby cause motion of said cam disk when said actuator is energized.

20. The actuator of claim 19 wherein said predetermined shape of said cam disk first side is flat.

21. The actuator of claim 19 wherein said predetermined shape of said cam disk first side is a tapered ramp.

22. The actuator of claim 19 wherein said cam disk second side has a predetermined shape.

23. The actuator of claim 22 wherein said predetermined shape of said cam disk first side is flat and said predetermined shape of said cam disk second side is a tapered ramp.

24. The actuator of claim 21 wherein said predetermined shape of said cam disk first side is a tapered ramp and said predetermined shape of said cam disk second side is flat.

25. A cam disk for an actuator comprising:

(a) a first side that is flat; and (b) a second side opposed to said first side, said second side having a ramp thereon that has opposed legs that each continuously taper downwardly from a common flat portion.

26. The cam disk of claim 25 further having an opening therethrough.

27. An actuator comprising:

(a) a drive motor having a gear;

(b) a position sensor in side by side arrangement with said drive motor;

(c) a cam disk having an opening therethrough and a first side having a predetermined shape and a second opposed side, said first side facing said position sensor, said position sensor in contact with said cam disk first side;

(d) a drive block having an opening, said drive block residing in said cam disk opening; and (e) a speed reducer having a gear which is engaged with said drive motor gear, said speed reducer also having an output shaft and a hollow input shaft through which said output shaft is extended, said extended output shaft connected to said drive block opening to thereby cause motion of said cam disk when said actuator is energized.

28. The actuator of claim 27 wherein said drive block comprises first and second leaf springs, and said drive block is sized to fit in said cam disk opening with said first and second leaf springs unsprung.

29. The actuator of claim 28 wherein said cam disk opening has first and second angled flats for engaging an associated one of said first and second drive leaf springs when said drive block is inserted in said cam disk opening.

30. The actuator of claim 27 further including a motor plate having an opening with threads therein, said cam disk having an outer edge with threads complementary to said threads in said motor plate opening, said cam disk threads in engagement with said threads in said motor plate opening.

31. A cylindrically shaped drive block for an actuator comprising:

(a) a first cantilever leaf spring cut in said drive block;

(b) a second cantilever leaf spring cut in said drive block; and (c) an opening at least partway therethrough.

32. The drive block of claim 31 wherein said first cantilever leaf spring is opposed to said second cantilever leaf spring.

\* \* \* \* \*